United States Patent
Inoue

(10) Patent No.: US 10,365,868 B2
(45) Date of Patent: Jul. 30, 2019

(54) IMAGE PROCESSING APPARATUS, IMAGE PROCESSING SYSTEM, IMAGE PROCESSING METHOD, AND NON-TRANSITORY RECORDING MEDIUM THAT VERIFIES VALIDITY OF AN ACCESS TOKEN OF A WEB APPLICATION

(71) Applicant: Hiroyuki Inoue, Kanagawa (JP)

(72) Inventor: Hiroyuki Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/104,399

(22) Filed: Aug. 17, 2018

(65) Prior Publication Data
US 2019/0095151 A1 Mar. 28, 2019

(30) Foreign Application Priority Data

Sep. 28, 2017 (JP) ................................. 2017-189193
Jun. 21, 2018 (JP) ................................. 2018-118087

(51) Int. Cl.
G06F 13/00 (2006.01)
G06F 3/12 (2006.01)
H04L 29/06 (2006.01)

(52) U.S. Cl.
CPC .......... *G06F 3/1238* (2013.01); *G06F 3/1222* (2013.01); *G06F 3/1255* (2013.01); *G06F 3/1258* (2013.01); *G06F 3/1288* (2013.01); *H04L 63/0853* (2013.01); *H04L 63/12* (2013.01)

(58) Field of Classification Search
None
See application file for complete search history.

(56) References Cited

U.S. PATENT DOCUMENTS

| | | | |
|---|---|---|---|
| 2007/0226808 A1* | 9/2007 | Uchikawa | ............. G06F 21/608 726/27 |
| 2011/0185183 A1 | 7/2011 | Yamamoto | |
| 2017/0142111 A1* | 5/2017 | Ezell | ....................... H04L 63/10 |
| 2017/0270290 A1 | 9/2017 | Inoue | |
| 2017/0272607 A1* | 9/2017 | Tamura | ............. H04N 1/00344 |

FOREIGN PATENT DOCUMENTS

| | | |
|---|---|---|
| JP | 2011-155495 | 8/2011 |
| JP | 2016-126462 | 7/2016 |
| JP | 2017-167755 | 9/2017 |
| JP | 2018-010433 | 1/2018 |
| WO | WO2015/163396 A1 | 10/2015 |

OTHER PUBLICATIONS

U.S. Appl. No. 15/907,671, filed Feb. 28, 2018, Hiroyuki Inoue.

* cited by examiner

*Primary Examiner* — Thomas D Lee

(74) *Attorney, Agent, or Firm* — Oblon, McClelland, Maier & Neustadt, L.L.P.

(57) ABSTRACT

An image processing apparatus includes circuitry to verify validity of an access token of a web application that is provided by a web server communicably connected to the image processing apparatus via a network. The circuitry determines whether one of a plurality of functions of the image processing apparatus is available to the web application based on the access token verified and determined as being valid in response to a request to use one of the plurality of functions from the web application. The plurality of functions of the image processing apparatus includes at least one of a print function and a scan function.

11 Claims, 10 Drawing Sheets

FIG. 6

| FUNCTION | AVAILABILITY |
|---|---|
| SCAN | true |
| PRINT | false |
| COPY | false |
| FAX | false |
| AUTHENTICATION | true |
| MAIL | true |
| ADDRESS BOOK | true |
| ... | ... |

420

IMAGE PROCESSING APPARATUS, IMAGE PROCESSING SYSTEM, IMAGE PROCESSING METHOD, AND NON-TRANSITORY RECORDING MEDIUM THAT VERIFIES VALIDITY OF AN ACCESS TOKEN OF A WEB APPLICATION

CROSS-REFERENCE TO RELATED APPLICATIONS

This patent application is based on and claims priority pursuant to 35 U.S.C. § 119(a) to Japanese Patent Application Nos. 2017-189193, filed on Sep. 28, 2017, and 2018-118087, filed on Jun. 21, 2018, in the Japan Patent Office, the entire disclosures of which are hereby incorporated by reference herein.

BACKGROUND

Technical Field

Embodiments of the present disclosure relate to an image processing apparatus, an image processing system, a method of processing an image, and a non-transitory recording medium storing instructions for executing a method of processing an image.

Related Art

Currently, a web application that is provided by a web server may be used to access various image processing functions such as printing and scanning of an image processing apparatus such as a multifunction peripheral (MFP). When one or more of the various image processing functions are used, the web application is authenticated by an access token, for example.

Meanwhile, there is no mechanism of limiting the use of the various image processing functions of the image processing apparatus when the image processing apparatus is used by the web application.

SUMMARY

An exemplary embodiment of the present disclosure includes an image processing apparatus including circuitry to verify validity of an access token of a web application that is provided by a web server communicably connected to the image processing apparatus via a network. The circuitry determines whether one of a plurality of functions of the image processing apparatus is available to the web application based on the access token verified and determined as being valid in response to a request to use one of the plurality of functions from the web application. The plurality of functions of the image processing apparatus includes at least one of a print function and a scan function.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is an example of a function availability table according to one of the embodiments;

Figure 1:
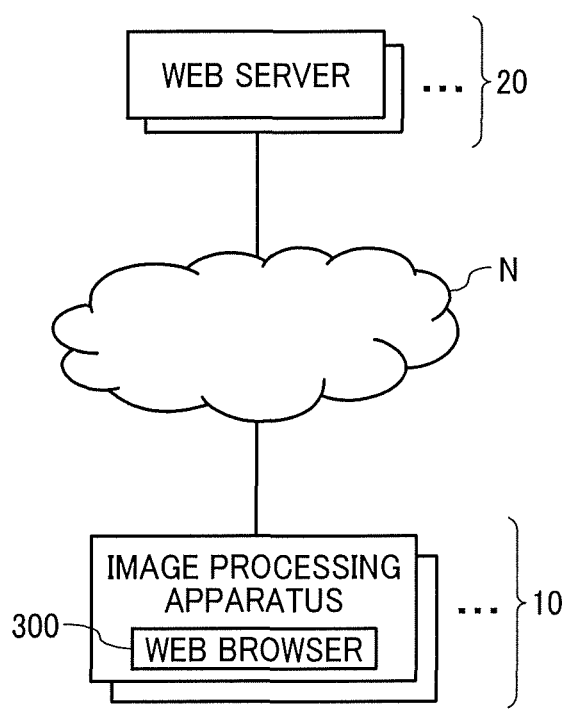
FIG. 1 is a schematic view illustrating an example configuration of an image processing system according to one of the embodiments.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of one of the embodiments of the present disclosure with reference to the attached drawings.

Overview of Configuration

A description is given of an overview of a configuration of an image processing system 1 according to one of the embodiments of the present disclosure with reference to FIG. 1. FIG. 1 is a schematic view illustrating an example configuration of the image processing system 1 according to the embodiment.

As illustrated in FIG. 1, the image processing system 1 according to the embodiment includes one or more image processing apparatuses 10 and one or more web servers 20. The image processing apparatus 10 and the web server 20 are communicably connected to each other via a wide area network N such as the Internet.

The image processing apparatus 10 is an electronic apparatus such as a multifunction peripheral in which a general-purpose web browser 300 is installed. A user of the image processing apparatus 10 can use web applications provided by the web server 20 by using the web browser 300. The web application provided by the web server 20 enables the user of the image processing apparatus 10 to print out an electronic file that is downloaded from a predetermined server, and to transmit to a designated destination electronic mail with attached image data that is generated by scanning a document, for example.

The web server 20 is a computer or a computer system that provides a web application via the network N. For example, the web application provided by the web server 20 is developed and provided by a third-party vendor that is different from a company that manufactures the image processing apparatus 10. The company, which manufactures the image processing apparatus 10 is also hereinafter referred to as a "manufacturer vendor".

The web application is implemented by interpreting and/or executing web content that is provided by the web server 20 on the web browser 300, which is mounted in the image processing apparatus 10. The web content includes, for example, Hypertext Markup Language (HTML), JavaScript (registered trademark), Cascading Style Sheets (CSS), and various image files.

As described above, the web application may have a configuration in which a program described with JavaScript is transmitted from the web server 20 to the image processing apparatus 10 and then executed on the image processing apparatus 10 to perform an image forming job. Alternatively, the web application may have a system configuration in which the web application itself is not transmitted to the image processing apparatus 10 but executed on the web server 20, and then the web server 20 transmits to the image processing apparatus 10 only an instruction (execution instruction information) to perform an image forming job. The execution instruction information includes, for example, information used for launching an Application Programming Interface (API) to use each function of the image processing apparatus 10. In such a system configuration, an access token may consist of text and be transmitted from the web server 20 to the image processing apparatus 10 without being included in the web application.

The web application provided by the web server 20 provides a web service to the user to use various functions of the image processing apparatus 10 by authenticating the image processing apparatus 10 using an access token that is issued from the manufacturer vendor in advance. The access token is, for example, authentication information to allow a web application developed by a third-party vendor to use the various functions of the image processing apparatus 10. Examples of the various functions of the image processing apparatus 10 include various image processing functions, such as a scanning function, a printing function, a copying function, a facsimile communication function, an authentication function, an address book function, and a mail transmission function.

The illustration of FIG. 1 is one example of the configuration of the image processing system 1, and any other suitable configuration may be used. For example, the image processing apparatus 10 is not limited to a multifunction peripheral, but may be a digital camera, a printer, a scanner, a copier, a projector, a facsimile device, an electronic conference (videoconference) terminal, an electronic whiteboard, an audio apparatus, an in-vehicle device (for example, car navigation system), or a household electric appliance (for example, a refrigerator). In other words, the image processing apparatus 10 may be any type of electronic apparatus that is equipped with the web browser 300 that is a general-purpose web browser.

Example of Hardware Configuration

Figure 2:
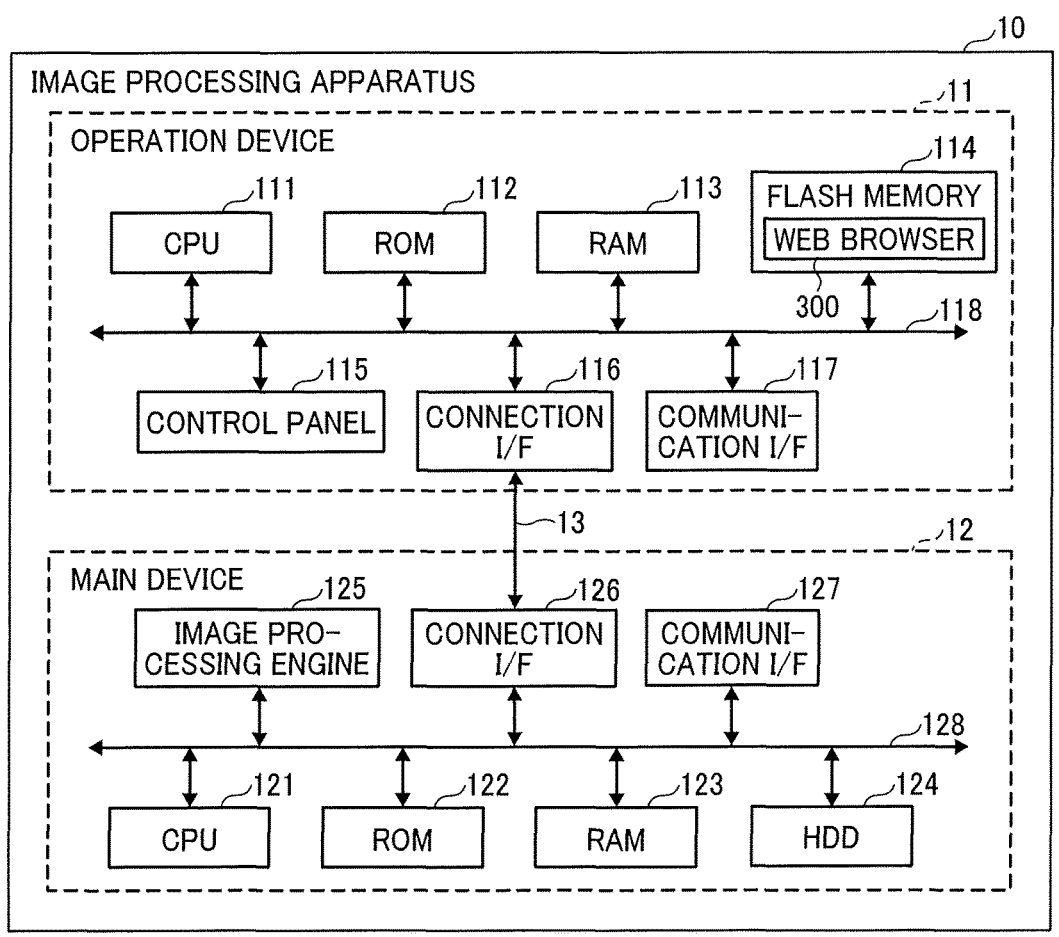
FIG. 2 is a block diagram illustrating an example of a hardware configuration of an image processing apparatus according to one of the embodiments.

Hereinafter, a description is given of a hardware configuration of the image processing apparatus 10 according to the embodiment with reference to FIG. 2. FIG. 2 is a block diagram illustrating an example of the hardware configuration of the image processing apparatus 10 according to the embodiment.

As illustrated in FIG. 2, the image processing apparatus 10 according to the embodiment includes, for example, an operation device (control device) 11 and a main device 12.

The operation device 11 is operated by a user to select an image processing function to be performed with the main device 12, to input various types of settings or instructions for starting execution of the image processing function, and to switch a display screen, for example.

The main device 12 executes various types of processing such as an image processing function according to a user operation performed with the operation device 11.

As illustrated in FIG. 2, the operation device 11 of the image processing apparatus 10 includes, for example, a central processing unit (CPU) 111, a read only memory (ROM) 112, and a random access memory (RAM) 113. The operation device 11 includes, for example, a flash memory 114, a control panel 115, a connection interface (I/F) 116, and a communication I/F 117. The above-mentioned hardware resources are connected to each other through a bus 118.

The CPU 111 executes various types of programs stored in the ROM 112 or the flash memory 114 using the RAM 113 as a work area to control overall operation of the operation device 11.

The ROM 112 is a nonvolatile semiconductor memory (storage device) capable of retaining programs and data even after the power is turned off. The RAM 113 is a volatile semiconductor memory (storage device) that temporarily stores programs and data.

The flash memory 114 is a nonvolatile storage device, and stores various types of programs (for example, the web browser 300) to be executed by the CPU 111 and various data.

The control panel 115 is used by the user to perform various types of operations. The control panel 115 also displays various screens to the user.

The connection I/F 116 is an interface for communicating with the main device 12 through a communication path 13. As one example of the connection I/F 116, a universal serial bus (USB) standard interface is used.

The communication I/F 117 is an interface for communicating with other apparatuses. As one example of the communication I/F 117, a wireless Local Area Network (LAN) using a Wireless Fidelity (Wi-Fi) standard is used.

As in the operation device 11, the main device 12 of the image processing apparatus 10 includes, for example, a CPU 121, a ROM 122, and a RAM 123. The main device 12 further includes, for example, a hard disk drive (HDD) 124, an image processing engine 125, a connection I/F 126, and a communication I/F 127. The above-mentioned hardware resources are connected to each other through a bus 128.

The CPU 121 executes a program stored in the ROM 122 or the HDD 124 using the RAM 123 as a work area to control overall operation of the main device 12.

The ROM 122 is a nonvolatile semiconductor memory (storage device) capable of retaining programs and data even after the power is turned off. The RAM 123 is a volatile semiconductor memory (storage device) that temporarily stores programs and data.

The HDD 124 is a nonvolatile storage device and stores various types of programs (for example, a program for implementing the embodiment) executed by the CPU 121 and various types of data.

The image processing engine 125 is a hardware resource that performs image processing to implement the various image processing functions including printing, scanning, copying, and facsimile communication.

The image processing engine 125 includes, for example, a plotter that prints an image on sheet member, a scanner that scans a document and optically reads an image of the document to generate image data, and a facsimile communication device that carries out facsimile communication. In some embodiments, the image processing engine 125 may also include a finisher that sorts printed sheets and/or an automatic document feeding device (ADF) that automatically feeds a document.

The connection I/F 126 is an interface to communicate with the operation device 11 through the communication path 13. As one example of the connection I/F 126, a universal serial bus (USB) standard interface is used.

The communication I/F 127 is an interface for communicating with other apparatuses. As one example of the communication I/F 127, a wireless LAN using a Wi-Fi standard is used.

With the hardware configuration as illustrated in FIG. 2, the image processing apparatus 10 according to the embodiment implements various types of processing, as is described later.

In FIG. 2, the image processing apparatus 10 includes the operation device 11, but the embodiments are not limited to this configuration. For example, in some embodiments, an information processing terminal such as a tablet terminal, a smartphone, a portable mobile phone, or a personal digital assistant (PDA) may serve as a control device (operation device) of the image processing apparatus 10. That is, such an information processing terminal may control the image processing apparatus 10 by communicating with the image processing apparatus 10 via the communication I/F 117 of the operation device 11 or the communication I/F 127 of the main device 12.

Layered Structure of Software of Image Processing Apparatus 10

Figure 3:
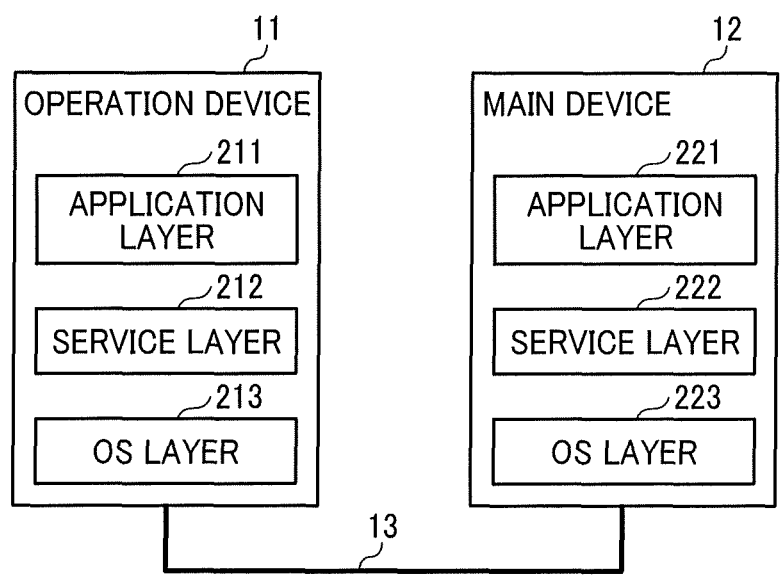
FIG. 3 is a block diagram illustrating an example of layered structure of software groups of an operation device and a main device of the image processing apparatus according to one of the embodiments.

A description is now given of a layered structure of software group included in each of the operation device 11 and the main device 12 of the image processing apparatus 10 according to the embodiment, with reference to FIG. 3.

FIG. 3 is a block diagram illustrating an example of a layered structure of software group of each of the operation device 11 and the main device 12 included in the image processing apparatus 10 according to the embodiment.

In FIG. 3, the layer structure of software group of the operation device 11 and the other layer structure of software group of the main device 12 are illustrated.

The layer structure of software group of the main device 12, (which is, namely, a program group stored in the ROM 122 or the HDD 124 of the main device 12) is described below. The software group included in the main device 12 is classified into an application layer 221, a service layer 222, and an operating system (OS) layer 223.

Software classified in the application layer 221 is executed to operate one or more hardware resources of the main device 12 to implement each of the image processing functions. More specifically, the software classified in the application layer 221 includes, for example, a print application, a scan application, a copy application, and a facsimile (FAX) application.

Software classified in the service layer 222 arbitrates between the application layer 221 and the OS layer 223. The software classified in the service layer 222 functions as an interface that enables the software of the application layer 221 to use the hardware resources included in the main device 12 and notifies the application layer 221 of a state of each hardware resource included in the main device 12.

More specifically, the software of the service layer 222 receives an execution request for each hardware resource and arbitrates the received execution request. The execution request received by the service layer 222 includes, for example, an execution request to perform image processing using the image processing engine 125 (for example, a scan execution request to scan using a scanner, a print execution request to print out using a plotter).

The same interface function described above of the software of the service layer 222 also applies in relation to the software of the application layer 211 of the operation device 11. That is, the software classified in the application layer 211 of the operation device 11 also implements each image processing function by accessing the service layer 222 to cause corresponding one or more hardware resources of the main device 12 to operate to implement the image processing function.

The software classified in the OS layer 223 is an operating system (OS), which is a program called as basic software. The basic software, namely OS, provides basic functions for controlling each hardware resource of the main device 12. The software classified in the OS layer 223 receives an execution request for each hardware resource from the software classified in the application layer 221 via the software classified in the service layer 222 and executes processing in response to the execution request.

The layer structure of software group included in the operation device 11, namely a program group stored in the ROM 112 and the flash memory 114 of the operation device 11, is described below. As in the main device 12, the software group of the operation device 11 is classified into the application layer 211, a service layer 212, and an OS layer 213.

However, a function provided by executing software classified in the application layer 211 and types of execution requests acceptable with the service layer 212 are different from those of the main device 12. The software classified in the application layer 211 of the operation device 11 mainly provides a user interface function for performing various types of operations and displays. Note that the web browser 300 is also software that is classified in the application layer 211.

In the embodiment, the OSes of the operation device 11 and the main device 12 operate individually and independently. Additionally, the OS of the operation device 11 may be different from or the same as the OS of the main device 12 as long as the operation device 11 and the main device 12 can communicate with each other. For example, the operation device 11 may use Android (registered trademark) as the OS while the main device 12 may use Linux (registered trademark) as the OS.

In the image processing apparatus 10 according to the embodiment, the operation device 11 is controlled by OS that is different from the OS of the main device 12. Accordingly, communication established between the operation device 11 and the main device 12 is not regarded as an inter-process communication in a shared apparatus, but as communication between two different information processing apparatuses.

However, the image processing apparatus 10 according to the embodiment is not limited to the above-described configuration in which the OS of the operation device 11 and the OS of the main device 12 are different from each other. Alternatively, the same type of OS may operate in each of the operation device 11 and the main device 12. Additionally, the image processing apparatus 10 according to the embodiment is not limited to the above-described configuration in which the OS of the operation device 11 and the OS of the main device 12 operate individually and independently, and, alternatively, a single OS may operate on the operation device 11 and the main device 12.

Software Configuration

Figure 4:
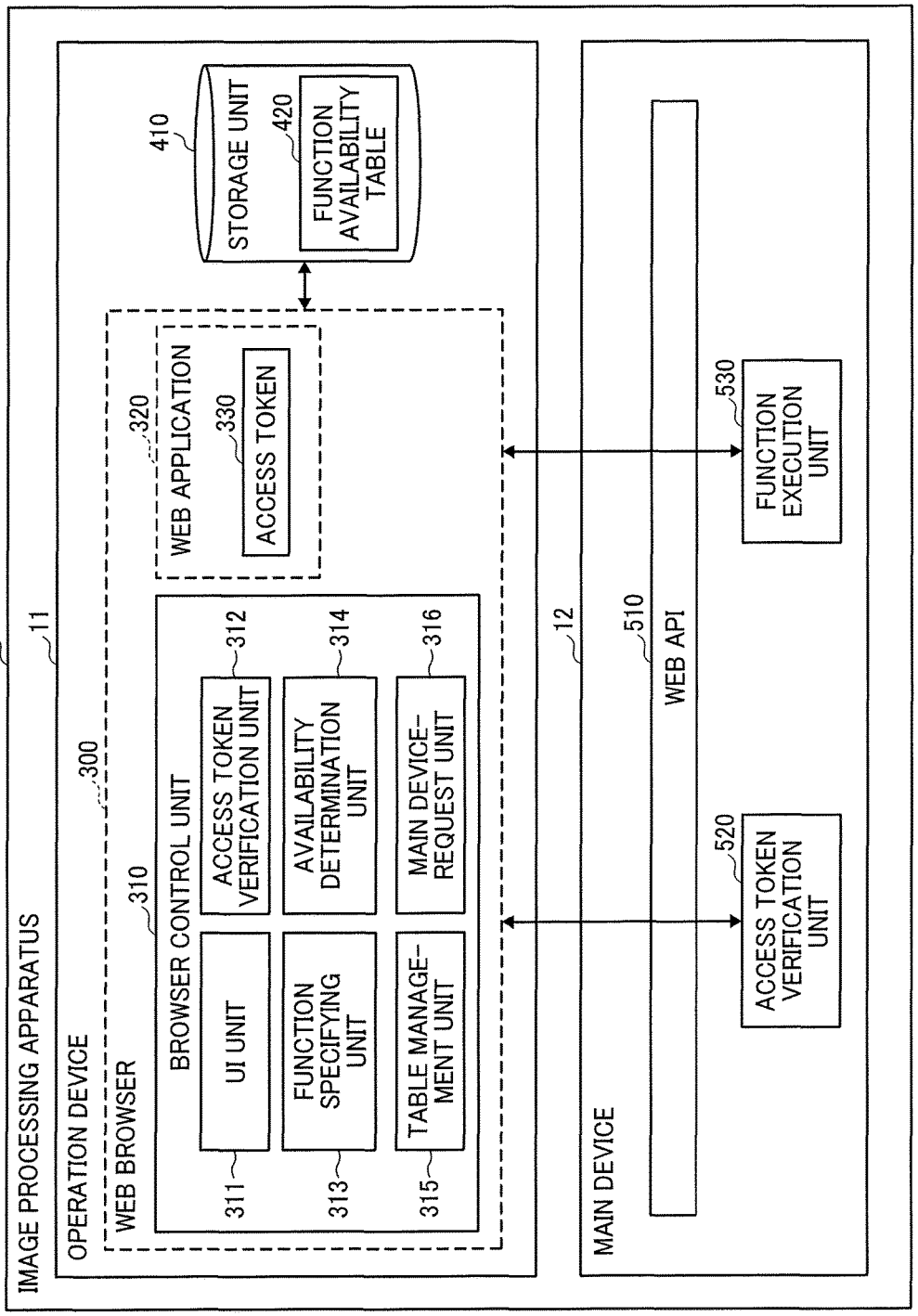
FIG. 4 is a block diagram illustrating an example of a software configuration of the image processing apparatus according to one of the embodiments.

A description is now given of a software configuration of the image processing apparatus 10 according to the embodiment with reference to FIG. 4.

FIG. 4 is a block diagram illustrating an example of the software configuration of the image processing apparatus 10 according to the embodiment.

As illustrated in FIG. 4, the operation device 11 of the image processing apparatus 10 according to the embodiment includes, for example, a browser control unit 310 and a web application 320. Each of the above-mentioned software resources is implemented by the CPU 111 operating according to the web browser 300. In particular, the web application 320 is implemented by executing, on the web browser 300, the web content (for example, JavaScript), which is provided by the web server 20.

Additionally, the main device 12 of the image processing apparatus 10 according to the embodiment further includes a storage unit 410. The storage unit 410 is implemented by the flash memory 114 and/or the RAM 113, for example.

The main device 12 of the image processing apparatus 10 according to the embodiment further includes a web API 510, an access token verification unit 520, and a function execution unit 530. Each of the above-mentioned software resources is implemented by the CPU 121 running one or more programs installed in the main device 12.

The web application 320 is implemented by launching, on the web browser 300, the web content, which is provided by the web server 20. The web application 320 includes an access token 330. Namely, the web content includes the access token 330. The access token 330 is transmitted from the web server 20 to the image processing apparatus 10 as web content, and is held in the web application 320.

The access token 330 includes information on a function (referred to as "function use information") used by the web application 320. The function use information included in the access token 330 is set by the manufacturer vendor according to an application from the third-party vendor, for example. Additionally, the access token 330 includes, for example, a token value represented by an arbitrary character string set by the manufacturer vendor, and a validity period indicating a period of time that the access token 330 is valid in addition to the function use information.

The browser control unit 310 executes various types of processing for implementing various functions of a general-purpose web browser, such as interpreting and displaying the web content. The browser control unit 310 includes, for example, a user interface (UI) unit 311, an access token verification unit 312, a function specifying unit 313, an availability determination unit 314, a table management unit 315, and a main device-request unit 316.

The UI unit 311 displays a web page corresponding to the web content. In addition, the UI unit 311 receives user operations performed on the web page (for example, a pressing, or clicking, a link).

The access token verification unit 312 verifies validity of a web page for the access token 330 previously verified as being valid by the access token verification unit 520 of the main device 12 (hereinafter, the validity of the web page is also referred to as "second validity"). The access token verification unit 312 verifies the second validity of the access token 330 by determining, for example, whether or not a title of the web page (information specified in a <TITLE> tag of HTML) matches a title included in the access token 330. As described above, the web browser 300 verifies the access token 330 included in the web content in processing the web content.

The function specifying unit 313 specifies a function requested by the web application 320 for use.

The availability determination unit 314 determines whether the function specified by the function specifying unit 313 (namely, the function requested by the web application 320 for use) is available or not. The availability determination unit 314 refers to a function availability table 420 to determine whether the function is available or not. The function availability table 420 is a table that stores information indicating availability of each function of the image processing apparatus 10 in relation to the web application 320. The function availability table 420 is stored in the storage unit 410.

The table management unit 315 updates the function availability table 420 using the function use information included in the access token 330 when the access token verification unit 312 determines that the access token 330 is valid. The table management unit 315 also acquires the function availability table 420 when the function specifying unit 313 specifies the function requested by the web application 320.

The main device-request unit 316 requests the main device 12 to execute the various processing via the web API 510 of the main device 12.

The web API 510 is an API for enabling the operation device 11 to request the main device 12 to execute the various processing. A verification request to verify the access token 330 and an execution request to execute each function are, respectively, transmitted to the access token verification unit 520 and the function execution unit 530, via the web API 510.

The access token verification unit 520 verifies the validity of a token value, a validity period, etc., for the access token 330 (hereinafter, the validity of the token value, the validity period, etc., is also referred to as "first validity"). That is, the access token verification unit 520 verifies the first validity of the access token 330 by determining, for example, whether the token value included in the access token 330 is correct or not, and/or whether the validity period has expired or not.

The function execution unit 530 executes the corresponding function (namely, the function requested by the web application 320 for use) when the availability determination unit 314 determines that the function is available.

Operation

A detailed description is now given of operation of the image processing system 1 according to the embodiment.

Process of Verifying Access Token 330

Hereinafter, a description is given of a process of verifying the validity of the access token 330 in response to a verification request from the web application 320, according to the embodiment, with reference to FIG. 5.

Figure 5:
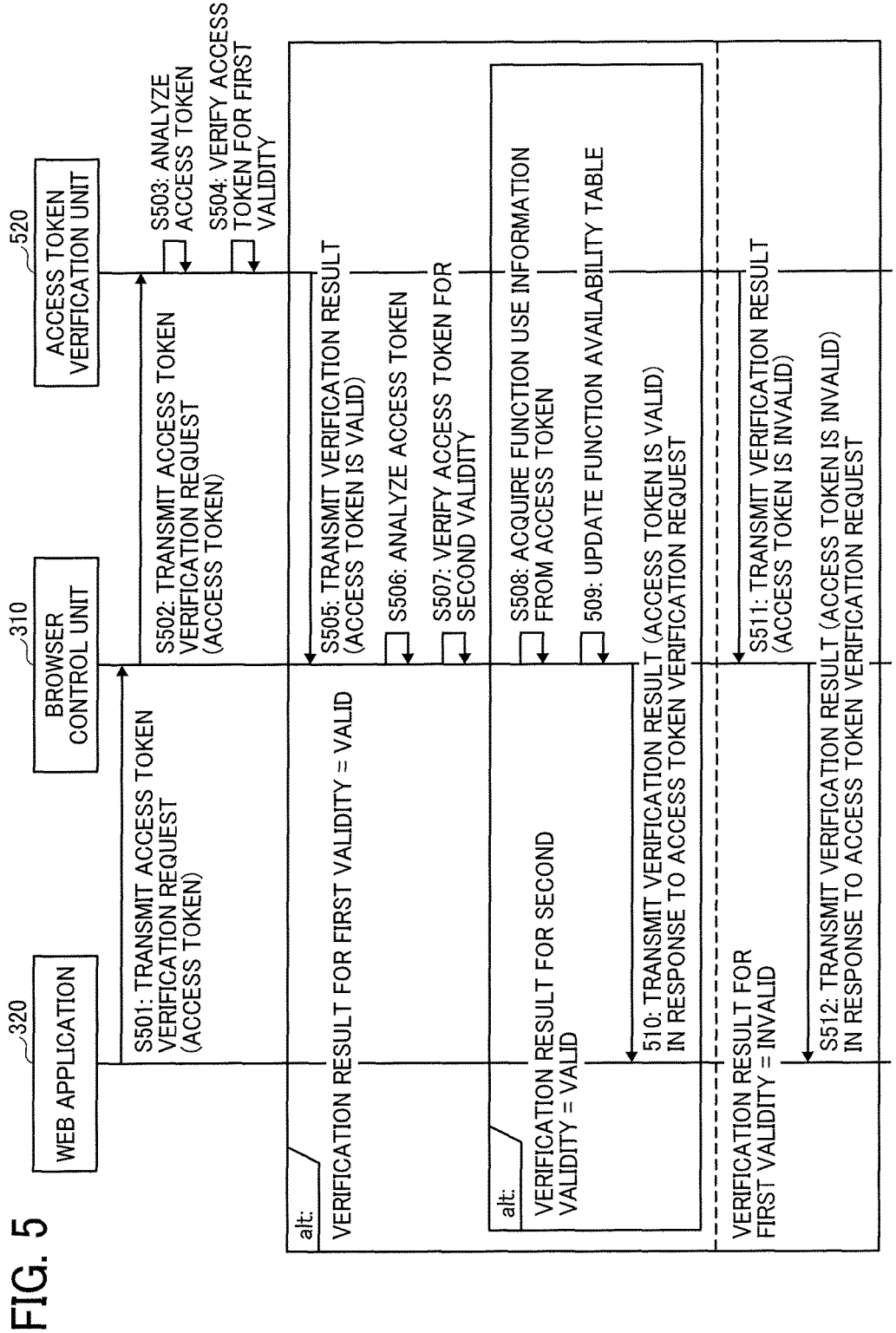
FIG. 5 is a sequence diagram illustrating an example of a process of verifying validity of an access token, according to one of the embodiments.

FIG. 5 is a sequence diagram illustrating an example of the process of verifying the validity of the access token 330 according to the embodiment. In the following description of the embodiment, the web application 320 has been implemented by executing web content provided by the web server 20 on the web browser 300. For example, when the user presses, or clicks, a shortcut icon indicating a Uniform Resource Locator (URL) of web content provided by the web server 20, the web browser 300 acquires the web content from the web server 20 (namely, the web content is downloaded from the web server 20). Alternatively, the user directly designates a URL of web content to an address bar of the web browser 300.

The web application 320 transmits an access token verification request to the browser control unit 310 (S501). The access token 330 is designated in the access token verification request.

The access token verification request to the browser control unit 310 may be implemented by designating the access token 330 as a parameter using an API (for example, JavaScript API) defined in a library provided by the manufacturer vendor, for example. The API for the access token verification request may be launched, for example, when an onload event occurs.

When receiving the access token verification request from the web application 320, the main device-request unit 316 of the browser control unit 310 transmits the access token verification request to the access token verification unit 520 of the main device 12 (S502). The access token 330 is designated in the access token verification request.

The access token verification request to the access token verification unit 520 may be implemented by designating the access token 330 as a parameter using an API defined in the web API 510, for example.

When receiving the access token verification request from the main device-request unit 316, the access token verification unit 520 analyzes the access token 330 designated in the access token verification request (S503). By analyzing the access token 330, the access token verification unit 520 specifies, for example, a token value and a validity period included in the access token 330.

The access token verification unit 520 verifies the first validity of the access token 330 using, for example, the token value and the validity period specified in the above-described step of S503 (S504). Namely, the access token verification unit 520 determines, for example, whether the token value specified in the above-described step of S503 is correct or not (whether the token value, which is specified in the above-described step of S503, matches the one set by the manufacturer vendor or not). Additionally, the access token verification unit 520 determines, for example, whether the validity period specified in the above-described step of S503 has expired.

When the token value specified in the above-described step of S503 is correct and the validity period has not expired yet, the access token verification unit 520 determines that the access token 330 is valid. On the other hand, when the token value specified in the above-described step of S503 is incorrect or the validity period has expired, the access token verification unit 520 determines that the access token 330 is invalid.

In contrast, if the determination of the step of S504 indicates that the access token 330 is valid, the access token verification unit 520 transmits a verification result indicating that the access token 330 is valid to the browser control unit 310 (S505).

Subsequently, the access token verification unit 312 of the browser control unit 310 analyzes the access token 330 (S506). By analyzing the access token 330, the access token verification unit 312 specifies, for example, a title (title of the web page) included in the access token 330.

Then, the access token verification unit 312 of the browser control unit 310 verifies the second validity of the access token 330 using the title specified in the above-described step of S506 (S507). That is, the access token verification unit 312 determines, for example, whether the title specified in the above-described step of S506 matches the title of the web page (for example, the title of the web page read immediately before the occurrence of the onload event).

When the title specified in the above-described step of S506 matches the title of the web page, the access token verification unit 312 determines that the access token 330 is valid. When the title specified in the above-described step of S506 does not match the title of the web page, the access token verification unit 312 determines that the access token 330 is invalid.

When the determination of the step of S507 indicates that the access token 330 is valid, the table management unit 315 of the browser control unit 310 acquires function use information from the access token 330 (S508).

The function use information is information on a function to be used by the web application 320, and is represented in a form of "Key=Value", for example. When multiple values are designated, the function use information is represented in a form in which the multiple values are divided using a comma, such as "Key=Value 1, Value 2", for example.

When the web application 320 is to use a scan function, for example, the function use information is represented as "Function=scan". As another example, when the web application 320 is to use a scan function and an authentication function, the function use information is represented as "Function=scan, auth".

In addition to the "scan" and "auth", other examples of the value, "Value", includes, for example, "print" that is designated when a printing function is to be used, and "copy" that is designated when a copying function is to be used. Furthermore, other example of the value, "Value", includes, for example, "fax" that is designated when a facsimile communication function is to be used, "mail" that is designated when a mail transmission function is to be used, and "address" that is designated when an address book function is to be used.

As described above, in the description of the embodiment, a function used by the web application 320 is designated as "Value", but the embodiments are not limited to this. Alternatively, a function not to be used by the web application 320 may be designated as "Value", for example.

Next, the table management unit 315 of the browser control unit 310 updates the function availability table 420 stored in the storage unit 410 using the function use information acquired in the above-described step of S508 (S509).

FIG. 6 illustrates the function availability table 420 that is updated when the function use information acquired in the above step of S508 is "Function=scan, auth, mail". FIG. 6 is an example of the function availability table 420.

As illustrated in FIG. 6, the function availability table 420 stores records in each of which a function of the image processing apparatus 10 is associated with an availability indication ("true" or "false"). Thus, "true" indicates that the function is available, and "false" indicates that the function is unavailable.

The availability indication of the function that is included in the function use information acquired in the above-described step of S508 is updated to "true" by the table management unit 315 among the functions included in the function availability table 420. The availability indication of the function that is not included in the function use information obtained in the above-described step of S508 is updated to "false" by the table management unit 315 among the functions included in the function availability table 420.

In the example table illustrated in FIG. 6, among the functions included in the function availability table 420, each availability indication of the function of "SCAN", the function of "AUTHENTICATION" and the function of "MAIL" is updated to "true". On the other hand, among the functions included in the function availability table 420, each availability indications of the functions other than "SCAN", "AUTHENTICATION", and "MAIL" is updated to "false".

As described above, the function availability table 420 stores the records in each of which each function of the image processing apparatus 10 is associated with the availability indication indicating whether the function is available to the web application 320.

Referring again to FIG. 5, subsequent to the step of S509, the access token verification unit 312 of the browser control unit 310 transmits the verification result indicating that the access token 330 is valid to the web application 320 in response to the access token verification request (S510).

On the other hand, when the determination of the step of S504 indicates that the access token 330 is invalid, the access token verification unit 520 transmits the verification result indicating that the access token 330 is invalid to the browser control unit 310 (S511).

Then, the access token verification unit 312 of the browser control unit 310 transmits the verification result indicating that the access token 330 is invalid to the web application 320 in response to the access token verification request (S512).

As described above, the image processing apparatus 10 according to the embodiment verifies the validity of the access token 330 in response to a verification request to verify the access token 330 from the web application 320. Additionally, the image processing apparatus 10 according to the embodiment uses the function use information included in the access token 330 determined as being valid to manage information on the one or more functions that are available to the web application 320 in the function availability table 420. This can limit the functions available to the web application 320 in a process of using a function, which is described later.

Additionally, a plurality of access tokens 330 may be individually assigned to each of the web pages provided by the web service. In this case, the one or more functions available with one of the access tokens 330 assigned to a corresponding web page may be different from those available with another one of the access tokens assigned to anther corresponding web page. With this configuration, a function is selected by a user on the top page and the top page transition to a next page according to the function selected by the user, for example. With this page configuration, each next page is set with an access token 330 with which the function selected on the top page (and necessary functions to use the function) is (are) available, for example. More specifically, for example, when a function of "scan" is selected on the top page, an access token 330 with which only functions of "scan" and "address book" are available is set to a page transitioned from the top page. For example, when a function of "copy" is selected on the top page, another access token 330 with which only a function of "copy" is available is set to a page transitioned from the top page.

Differentiating functions available with each access token 330 for the corresponding web page as described above limits the functions available with each access token 330, even in a case where the access token 330 is leaked. This reduces the risks incurred as a result of the access token 330 being compromised.

Process of Using Function

Figure 7:
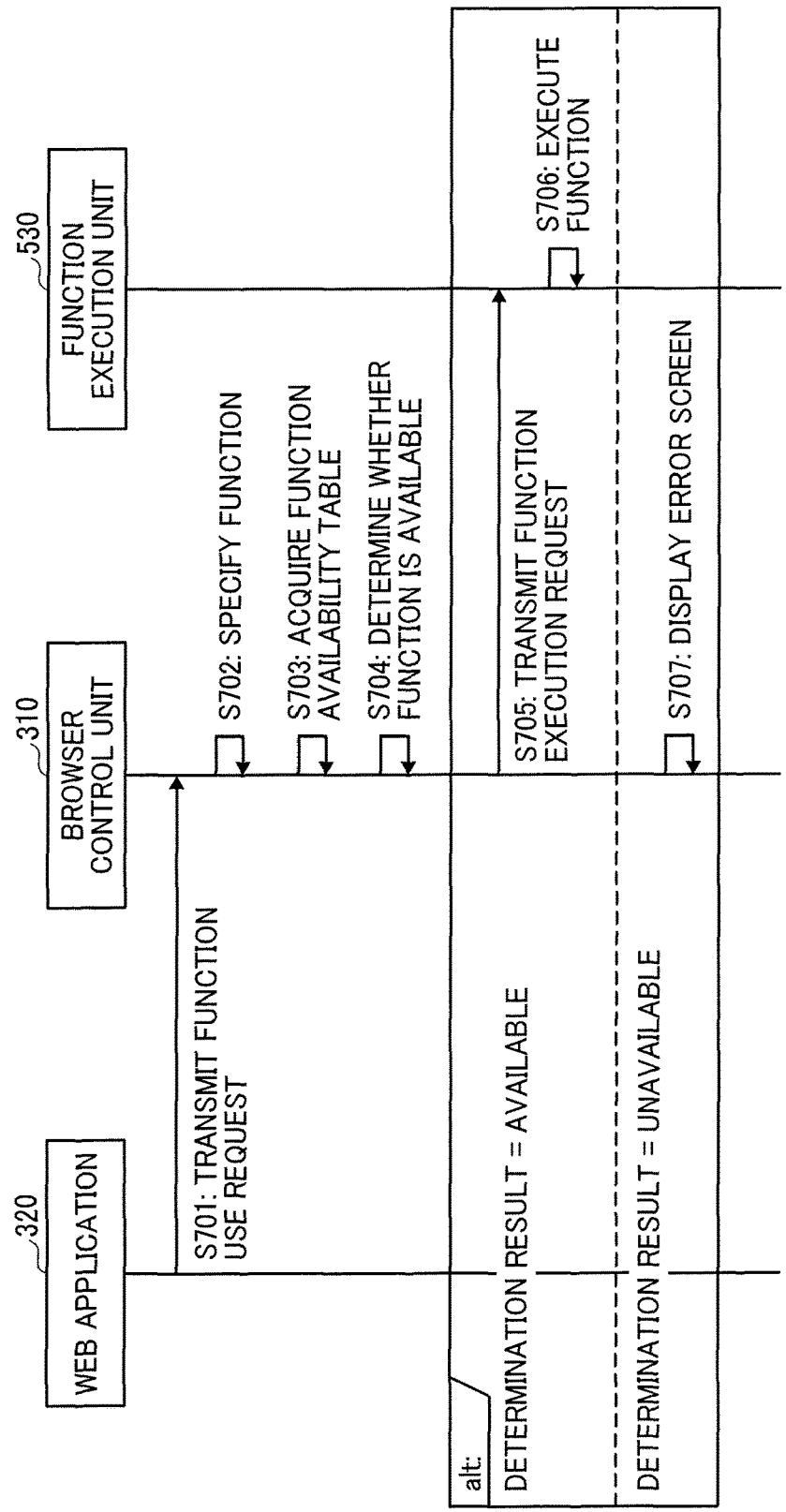
FIG. 7 is a sequence diagram illustrating an example of a process of using a function according to one of the embodiments.

Hereinafter, a description is given of a process of using a function (for example, scanning, printing, etc.) of the image processing apparatus 10 using the web application 320, according to the embodiment, with reference to FIG. 7. FIG. 7 is a sequence diagram illustrating an example of the process of using a function according to the embodiment.

The web application 320 transmits a request to use a function (function use request) to the browser control unit 310 (S701). The web application 320 transmits, to the browser control unit 310, the function use request in response to a user operation for starting execution of the function. The user operation is performed on a screen (function use screen) for starting use of the function.

The function use request to the browser control unit 310 can be transmitted using, for example, an API (for example, API of JavaScript) defined in a library provided by the manufacturer vendor.

Figure 8:
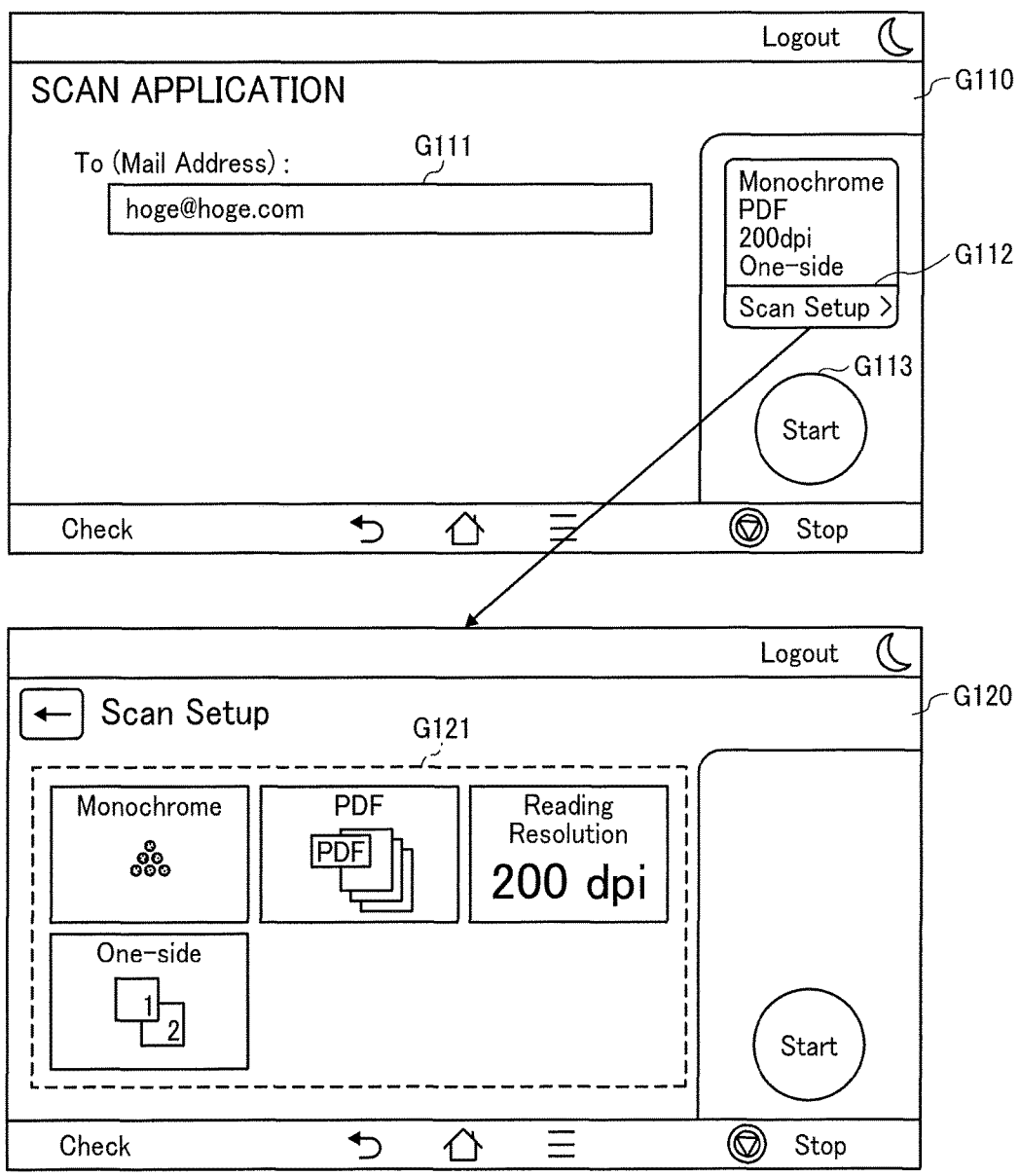
FIG. 8 is an illustration of an example (part 1) of a function use screen according to one of the embodiments.

Referring now to FIG. 8, a function use screen G110 for using functions of scanning and mail transmission is illustrated. FIG. 8 is an illustration of an example (part 1) of the function use screen according to the embodiment.

The function use screen G110 illustrated in FIG. 8 is displayed by the web application 320 that provides a web service for sending image data generated by scanning to a designated mail address. The function use screen G110 illustrated in FIG. 8 includes a mail address designation field G111 for designating a mail address, a scan setup button G112 for transitioning to a scan setup screen G120, and an execution (start) button G113. On the scan setup screen G120 displayed by pressing, or clicking, the scan setting button G112, the user designates values of various scan settings (for example, monochrome or color, output data format, reading resolution, one-side or double-side, etc.) in the scan setup field G121.

When the user clicks the start button G113 after designating at least a mail address in the mail address designation field G111, the web application 320 transmits to the browser control unit 310 the function use request to execute the function (scanning and mail transmission function). When the values for the scan setup are not specified on the scan setup screen G120, default values are designated as the settings for the scan setup, for example.

Figure 9:
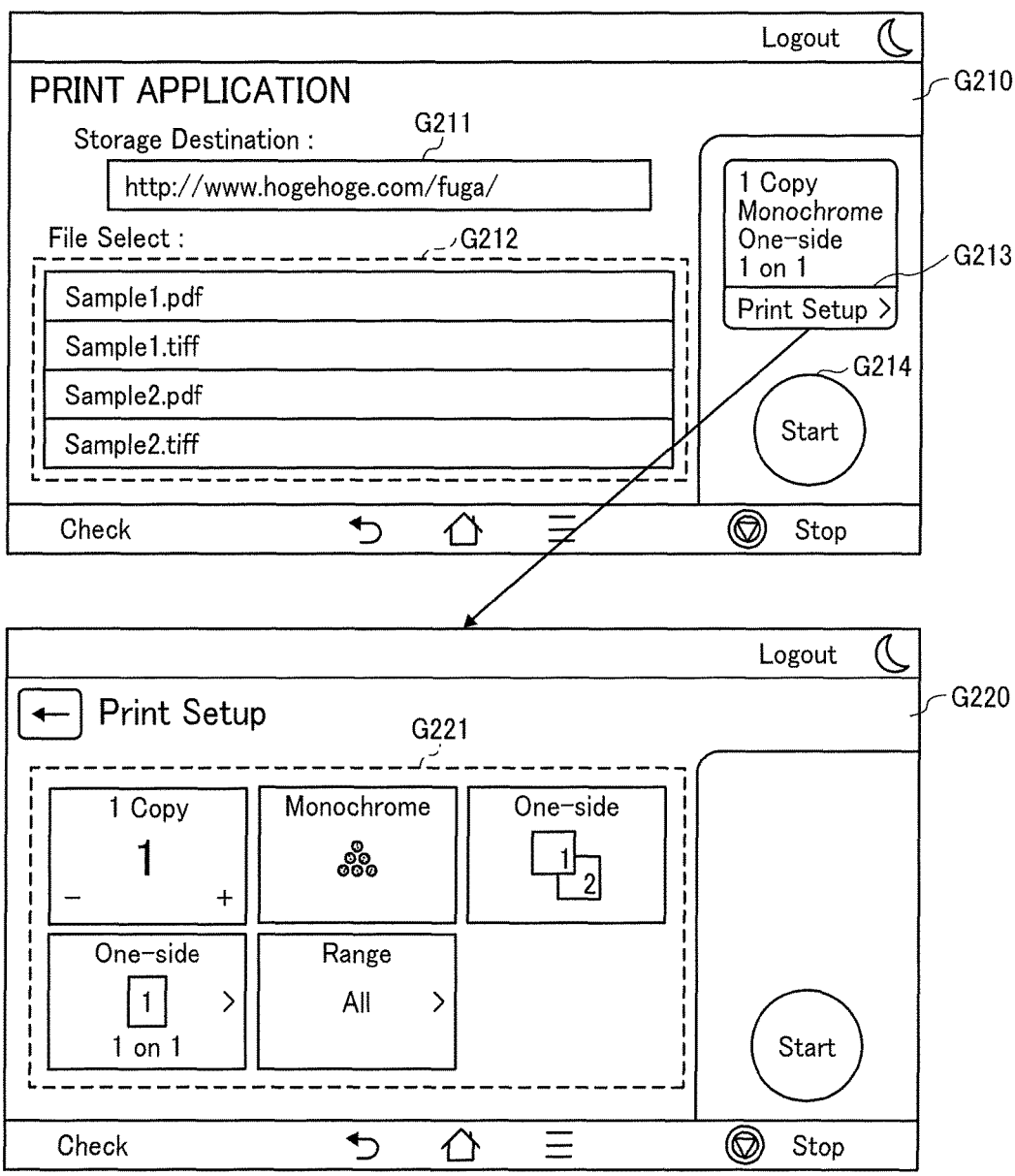
FIG. 9 is an illustration of another example (part 2) of the function use screen according to one of the embodiments.

Additionally, a function use screen G210 for using the print function is illustrated in FIG. 9. FIG. 9 is an illustration of an example (part 2) of the function use screen G210 according to the embodiment.

The function use screen G210 illustrated in FIG. 9 is displayed by a web application 320 that provides a web service for downloading and printing an electronic file stored in, for example, an external storage. The function use screen G210 illustrated in FIG. 9 includes an external storage designation column G211 for designating a URL of an external storage and a file selection column G212 for selecting an electronic file stored in the external storage. Further, the function use screen G210 illustrated in FIG. 9 includes a print setup button G213 for transitioning to a print setup screen G220 and an execution (start) button G214. On the print setup screen G220 displayed by pressing, or clicking, the print setup button G213, the user can select settings of various print settings (for example, the number of copies, monochrome or color, one-side or double-side, the number of pages per sheet, print range, etc.) in the print setup field G221.

When the user clicks the start button G214 after designating at least an external storage in the external designation field G211 and an electronic file is selected from a file select field G212, the web application 320 transmits to the browser control unit 310 the function use request to execute the function (printing function). When the values for the print setup are not specified on the print setup screen G220, default values are designated as the values for the print setup, for example.

Referring again to FIG. 7, subsequent to S701, the function specifying unit 313 of the browser control unit 310 specifies a function for use, which is requested by the web application 320 (S702). For example, by specifying the API launched in the above-described step of S701, the function specifying unit 313 can specify the function corresponding to the API as a function requested by the web application 320 for use.

Subsequently, the table management unit 315 of the browser control unit 310 acquires the function availability table 420 stored in the storage unit 410 (S703). The table management unit 315 may acquire each record stored in the function availability table 420, or alternatively, may acquire records each of which has "true" as an availability indication among all the records stored in the function availability table 420.

Subsequently, the availability determination unit 314 of the browser control unit 310 refers to the function availability table 420 acquired in the above-described step of S703, and determines whether the function specified in the above-described step of S702 is available or not (S704). In other words, the availability determination unit 314 determines which one of "true" and "false" is associated with the specified function in the function availability table 420.

When "true" is associated with the specified function, the availability determination unit 314 determines that the function is available. On the other hand, when "false" is associated with the specified function, the availability determination unit 314 determines that the function is unavailable.

When the determination of S704 indicates that the specified function is available, the main device-request unit 316 of the browser control unit 310 transmits a function execution request to the function execution unit 530 of the main device 12 to execute the function specified in S702 (S705).

The function execution request to the function execution unit 530 can be transmitted using, for example, the API defined in the web API 510. At this time, various settings (for example, settings for the print setup, settings for the scan setup, etc.) used for executing the function are designated as parameters, for example.

In response to the function execution request, the function execution unit 530 executes the function (S706). As a result, the function requested by the web application 320 is executed.

Figure 10:
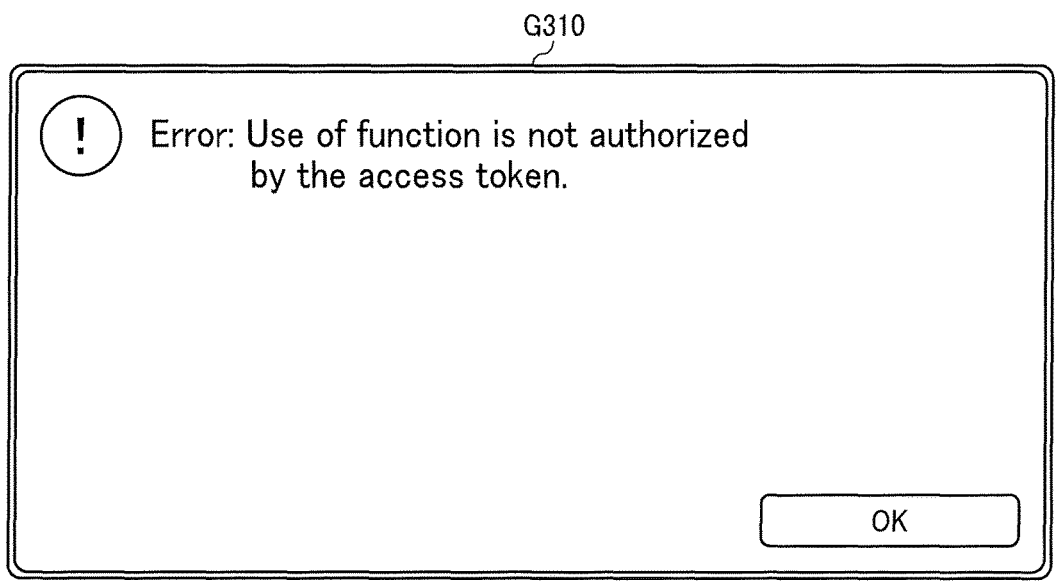
FIG. 10 is an illustration of an example of an error screen, according to one of the embodiments.

On the other hand, when the determination of S704 indicates that the specified function is not available, the UI unit 311 of the browser control unit 310 displays, for example, an error screen G310 as illustrated in FIG. 10 on the control panel 115 (S707).

The error screen G 310 illustrated in FIG. 10 is a screen indicating that the use of the function requested by the web application 320 is not authorized (prohibited) by the access token 330. This informs the user of the image processing apparatus 10 that the function cannot be used by the web application 320.

As described above, the image processing apparatus 10 according to the present embodiment refers to the function availability table 420 to determine whether a function requested by the web application 320 is available in response to a function use request from the web application 320. Then, the image processing apparatus 10 according to the present embodiment prohibits the use of the function when determining that the function cannot be used. Thus, the functions available to the web application 320 are limited based on the function use information included in the access token 330.

The function use request in the above-described step of S701 may be transmitted when the API of the function is used, in addition to or in alternative to the example case described above. The case where the API of the function is used includes the following CASE (1) and CASE (2).

CASE (1) When an API for acquiring function capability (for example, settings for a function) is launched in response to a trigger of user operation performed by a user to display a predetermined screen (for example, a setting select screen for a job).

CASE (2) When an API for registering a call back function for receiving a job event (that is, a function used for waiting until an operation indicating start of job execution performed by a user) is launched in the launching of a web application in response to starting up the web application 320 for use of scanning from a short cut, for example.

Each of (1) and (2) can also be regarded as a preparation stage for executing a job relating to the function. At this stage, the user cannot press, or click, the start button of the image processing apparatus 10 (button for starting execution of the job (for example, start button G214)), accordingly. Additionally, when an error screen (for example, the error screen G310 displayed in the above step of S707) is displayed at this stage, the error screen is displayed before the function use screen G110 is displayed, for example.

As described above, in the image processing system 1 according to the embodiment, only functions permitted at the time of issuance of the access token 330 are available to the web application 320 developed and provided by the third-party vendor, for example. Even if the access token 330 is leaked, the security risks incurred by the access token 330 being compromised are minimal, because the functions that are permitted to be used, in advance, with the access token 330 are anyway limited.

As described above, a web application may be developed and provided by a third-party vendor that is different from the company that manufactures the image processing apparatus, for example. The company that manufactures the image processing apparatus issues an access token for each web application according to an application from each third-party vendor who develops and provides the web application, for example.

In this case, when an access token is leaked from a third-party vendor, security problems may occur. That is, in this case, all the image processing functions of the image processing apparatus may be used without authorization by another web application developed by another third vender, for example. On the other hand, the one or more image processing functions to be available to one web application are often different from that to be available to another web application, for example.

The image processing system 1 according to the embodiment prevents the above-described case, in which all the image processing functions of the image processing apparatus are used without authorization by the other web application developed by the other third vender.

Note that the "process of verifying an access token" and the "process of using a function" described above may be performed in parallel while the main device 12 including the image processing engine 125 is shifting to a standby state. Thereby, the "process of verifying an access token" and the "process of using a function" are performed while the main device 12 is shifting to the standby state, when the operation device 11 (and the web browser 300) is set to be preferentially activated in response to startup of the image processing apparatus 10, for example. This reduces the waiting time of the user in executing the function.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image processing apparatus, comprising:
circuitry configured to:
verify validity of an access token of a web application that is provided by a web server communicably connected to the image processing apparatus via a network; and
determine whether one of a plurality of functions of the image processing apparatus is available to the web application based on the access token verified and determined as being valid in response to a request to use one of the plurality of functions from the web application, and
the plurality of functions of the image processing apparatus including at least one of a print function and a scan function,
wherein the circuitry causes a display of the image processing apparatus to display a screen indicating that one of the plurality of functions requested from the web application is unavailable in response to a determination by the circuitry that one of the plurality of functions is unavailable to the web application,
wherein the web application requests one of the plurality of functions for use in response to an instruction to display a select screen used to set setup information used to execute one of the plurality of functions, and
wherein the circuitry causes the display to display the screen indicating that one of the plurality of functions requested from the web application is unavailable before the select screen used to set the setup information is displayed on the display, in response to a determination indicating that one of the plurality of functions is unavailable to the web application.

2. The image processing apparatus of claim 1, further comprising a memory configured to store a web browser, wherein the circuitry:
processes web content transmitted from the web server to the image processing apparatus on the web browser to launch the web application to use one of the plurality of functions, the plurality of functions including the at least one of the print function and the scan function; and
verifies the validity of the access token included in the web content in processing the web content.

3. The image processing apparatus of claim 1,
wherein the access token includes function use information indicating one or more functions available to the web application, and
wherein the circuitry determines whether one of the plurality of functions requested from the web application is included in the one or more functions indicated by the function use information that is included in the access token verified and determined as being valid.

4. The image processing apparatus of claim 3, further comprising a memory configured to store a function availability table indicating whether each of the plurality of functions is available to the web application,
wherein the circuitry:
updates the function availability table stored in the memory based on the function use information included in the access token verified and determined as being valid; and
refers to the function availability table stored in the memory to determine whether one of the plurality of functions requested from the web application is available to the web application or not.

5. The image processing apparatus of claim 1,
wherein, to verify the validity of the access token, the circuitry determines at least one of whether a token value included in the access token is correct or not, whether a validity period included in the access token has expired or not, and whether a title included in the access token matches a title of a web page provided by the web application or not.

6. The image processing apparatus of claim 5,
wherein the access token includes function use information indicating one or more functions available to the web application, and
wherein the function use information is set for each web page.

7. The image processing apparatus of claim 1, further comprising a memory configured to store a browser, the browser requesting a web server being an access destination designated by a user instruction, for web content data, and receiving the web content data as a response,
the web content data received by the browser includes the access token and a program described with JavaScript (registered trademark), and
wherein the circuitry executes the program described with JavaScript (registered trademark) on the browser to implement the web application.

8. The image processing apparatus of claim 1,
wherein the circuitry executes one of the plurality of functions, which is requested from the web application and available to the web application, in response to a determination by the circuitry that one of the plurality of functions requested from the web application is available.

9. An image processing system, comprising:
the image processing apparatus of claim 1; and
a web server communicably connected to the image processing apparatus via a network.

10. A method of processing an image, comprising:
verifying validity of an access token of a web application that is provided by a web server communicably connected to an image processing apparatus via a network; and
determining whether one of a plurality of functions of the image processing apparatus is available to the web application based on the access token verified and determined as being valid in response to a request to use one of the plurality of functions from the web application, the plurality of functions of the image processing apparatus including at least one of a print function and a scan function,
wherein the method further includes
causing a display of the image processing apparatus to display a screen indicating that one of the plurality of functions requested from the web application is unavailable in response to a determination that one of the plurality of functions is unavailable to the web application,
wherein the web application requests one of the plurality of functions for use in response to an instruction to display a select screen used to set setup information used to execute one of the plurality of functions, and
causing the display to display the screen indicating that one of the plurality of functions requested from the web application is unavailable before the select screen used to set the setup information is displayed on the display, in response to a determination indicating that one of the plurality of functions is unavailable to the web application.

11. A non-transitory recording medium storing a plurality of instructions which, when executed by one or more processors, cause the processors to perform a method, comprising:
verifying validity of an access token of a web application that is provided by a web server communicably connected to an image processing apparatus via a network, and
determining whether one of a plurality of functions of the image processing apparatus is available to the web application based on the access token verified and determined as being valid in response to a request to use one of the plurality of functions from the web application, the plurality of functions of the image processing apparatus including at least one of a print function and a scan function,
wherein the method further includes
causing a display of the image processing apparatus to display a screen indicating that one of the plurality of functions requested from the web application is unavailable in response to a determination that one of the plurality of functions is unavailable to the web application,
wherein the web application requests one of the plurality of functions for use in response to an instruction to display a select screen used to set setup information used to execute one of the plurality of functions, and
causing the display to display the screen indicating that one of the plurality of functions requested from the web application is unavailable before the select screen used to set the setup information is displayed on the display, in response to a determination indicating that one of the plurality of functions is unavailable to the web application.

* * * * *